United States Patent
Jung et al.

(10) Patent No.: US 10,495,202 B2
(45) Date of Patent: Dec. 3, 2019

(54) ANGULAR GEAR ARRANGEMENT FOR MOWER KNIVES DRIVEN IN AN OSCILLATING MANNER

(71) Applicant: EWM EICHELHARDTER WERKZEUG- UND MASCHINENBAU GMBH, Eichelhardt (DE)

(72) Inventors: Marco Jung, Oberhonnefeld (DE); Heinrich Günter Schumacher, Eichelhardt (DE)

(73) Assignee: EWM EICHELHARDTER WERKZEUG- UND MASCHINENBAU GMBH, Eichelhardt (DE)

(*) Notice: Subject to any disclaimer, the term of this patent is extended or adjusted under 35 U.S.C. 154(b) by 222 days.

(21) Appl. No.: 15/569,623

(22) PCT Filed: Mar. 23, 2016

(86) PCT No.: PCT/EP2016/056357
§ 371 (c)(1),
(2) Date: Oct. 26, 2017

(87) PCT Pub. No.: WO2016/173781
PCT Pub. Date: Nov. 3, 2016

(65) Prior Publication Data
US 2018/0119787 A1 May 3, 2018

(30) Foreign Application Priority Data
Apr. 27, 2015 (EP) .................................... 15165288

(51) Int. Cl.
*F16H 37/12* (2006.01)
*A01D 41/14* (2006.01)
(Continued)

(52) U.S. Cl.
CPC ............ *F16H 37/122* (2013.01); *A01D 34/30* (2013.01); *A01D 41/142* (2013.01); *A01D 69/06* (2013.01);
(Continued)

(58) Field of Classification Search
CPC .. F16H 37/122; F16H 57/021; F16H 57/0025; F16H 21/365; F16H 1/203;
(Continued)

(56) References Cited

U.S. PATENT DOCUMENTS

| 4,446,683 A | 5/1984 | Rempel et al. |
| 2009/0107288 A1* | 4/2009 | Gil ........................ A01D 41/142 74/606 R |
| 2018/0153097 A1* | 6/2018 | Schumacher .......... A01D 34/30 |

FOREIGN PATENT DOCUMENTS

| DE | 10 2004 037 580 A1 | 3/2006 |
| EP | 922 309 C | 1/1955 |
| EP | 0 819 370 A1 | 1/1998 |

OTHER PUBLICATIONS

International Preliminary Report on Patentability for PCT/EP2016/056357, dated Mar. 30, 2017.
(Continued)

*Primary Examiner* — Jeremy R Severson
(74) *Attorney, Agent, or Firm* — Sughrue Mion, PLLC

(57) ABSTRACT

An angular gear arrangement for mower knife driven in an oscillating manner, including a transmission housing, an input shaft, which engages in the interior of the transmission housing, a rotor, which is mounted in the transmission housing to be rotatable about a first axis of rotation by a first bearing, a crankshaft, which engages in the receiving space of the rotor through the receiving opening and is mounted in the receiving space, to be rotatable about a second axis of rotation by a second bearing, a driving element, which is non-rotationally connected to the rotor and mounted so as to be rotatable about the first axis of rotation by at least one third bearing, and support means, which are arranged in the transmission housing and on which the third bearing is axially supported, the support means being releasably fastened to the transmission housing.

17 Claims, 2 Drawing Sheets

(51) Int. Cl.
| | |
|---|---|
| *F16H 1/20* | (2006.01) |
| *F16H 21/36* | (2006.01) |
| *F16H 57/00* | (2012.01) |
| *F16H 57/021* | (2012.01) |
| *F16H 57/023* | (2012.01) |
| *A01D 34/30* | (2006.01) |
| *A01D 69/06* | (2006.01) |
| *F16H 57/02* | (2012.01) |
| *A01D 34/404* | (2006.01) |
| *A01D 101/00* | (2006.01) |

(52) U.S. Cl.
 CPC ............ *F16H 1/203* (2013.01); *F16H 21/365* (2013.01); *F16H 57/0025* (2013.01); *F16H 57/021* (2013.01); *F16H 57/023* (2013.01); *A01D 34/404* (2013.01); *A01D 2101/00* (2013.01); *F16H 2057/02056* (2013.01)

(58) Field of Classification Search
 CPC ......... F16H 57/023; F16H 2057/02056; A01D 69/06; A01D 34/30; A01D 41/142; A01D 2101/00; A01D 34/404
 See application file for complete search history.

(56) References Cited

OTHER PUBLICATIONS

International Search Report for PCT/EP2016/056357, dated Jun. 22, 2016.

\* cited by examiner

ANGULAR GEAR ARRANGEMENT FOR MOWER KNIVES DRIVEN IN AN OSCILLATING MANNER

This application is a National Stage of International Application No. PCT/EP2016/056357 filed Mar. 23, 2016, claiming priority based on European Patent Application No. 15165288.0 filed Apr. 27, 2015, the contents of all of which are incorporated herein by reference in their entirety.

BACKGROUND OF THE INVENTION

Field of the Invention

The present invention relates to an angular gear arrangement for mower knife driven in an oscillating manner.

Background

DE 10 2004 037 580 A1 shows an angular gear arrangement for mower knives driven in an oscillating manner. The known angular gear arrangement has a bevel gear with an input shaft and a rotor being arranged at an angle to the input shaft. A crankshaft is received eccentrically within the rotor. A driving element in form of a bevel gear is non-rotationally mounted onto an inner longitudinal end of the rotor, wherein the bevel gear is fixed by means of a shaft nut to the rotor. The bevel gear is axially supported on a rolling bearing. The rolling bearing is supported against an annular axial shoulder being formed at the housing, wherein the axial shoulder serves as support means and as stop element. In order to insert the bevel gear of the rotor and the corresponding rolling bearing into the transmission housing, an access opening is formed in an upper housing portion of the housing. The rolling bearing is inserted from above into the housing interior and is pushed downwards until it reaches the stop element. The rotor is inserted into the housing interior from below through a housing opening being formed in the lower housing portion, and is pushed into the bevel gear. Then, the shaft nut is screwed through the upper access opening onto the rotor.

From EP 0 819 370 A1 a hand-guided, self-propelled working machine is known, which has a drive device for a reciprocatingly moveable working tool. The drive device consists of a drive shaft being supported in a housing and being arranged parallel to the axes of rotation of a crank and of a crankshaft. A bevel gear of a crank gearing is non-rotationally connected to the crank, wherein the bevel gear is rotatably supported relative to the housing by means of a ball bearing. The ball bearing is detachably supported on the housing.

DE 922 309 C discloses a device for driving a reciprocatingly moving knife of a mower by means of a rotating shaft, which, by means of a crank disc with a crank pin, drives an oscillating lever. Said lever is rotatably mounted within a bearing journal that is arranged at a right angle to the movement plane of the knife. The said lever is articulatedly connected at its one end to the knife. The crank pin is connected to the crank disc being mounted to the rotating shaft, such that the longitudinal axis of the crank pin intersects the axis of the rotating shaft at the axis of the bearing journal, wherein the axis of the rotating shaft is arranged at a right angle to the bearing journal of said lever.

It is an object of the present disclosure to provide a gear arrangement which is easy to mount and is easy to service.

SUMMARY OF THE INVENTION

The object is met according to the invention by an angular gear arrangement for mower knives of the above named type, driven in an oscillating manner, such, that the support means are detachably mounted on the transmission housing. According to the invention it is thus provided, that the support means for the third bearing, which support the driving element non-rotationally connected to the rotor, can be detached, respectively removed for the assembly and dismantling of a bevel gearing received in the transmission housing. In this manner the support means can be removed from the housing interior, i.e. from a housing space enclosed by the transmission housing, so that the third bearing and the driving element can be inserted in an unimpeded manner into the housing interior. Because of the detachability of the support means, the assembly of the angular gear arrangement is simplified, as the insertion direction is not predetermined anymore by the abutment element supporting the third bearing and formed on the housing.

Preferably, the third bearing is supported with a lower face of the third bearing directed towards the receiving opening on the support means. In other words, the support means are arranged below the third bearing, i.e. between the third bearing and the receiving opening, in the housing interior. If the support means are detached or removed, besides the rotor and the crankshaft, thus also the third bearing and the driving element can be mounted from below, especially through a housing opening engaged through by the crankshaft and/or the rotor. From below means a portion of the angular gear arrangement in direction of the receiving opening or around the receiving opening of the rotor. Above the third bearing, an input shaft of the angular gear arrangement, rotatably supported around a third axis of rotation, is arranged. The third axis of rotation is aligned at an angle to the first and the second axis of rotation. The terms at the top and bottom or above and below are, thus, to be understood only in relation to the transmission housing, i.e. thus, an assembly position of the transmission housing is not predetermined, so that the transmission housing itself does not have to be necessarily arranged with the receiving opening or the housing opening, engaged through by the crankshaft and/or the rotor, directed downwards.

Advantageously, the support means can have a retaining ring, wherein the retaining ring engages in an inner groove of the transmission housing extending in circumferential direction. Thus, the support means can be attached and again be detached in an especially simple manner in the housing interior of the transmission housing.

Furthermore, at the lower face of the third bearing, a further detachable retaining ring can be provided, which engages in a groove of the driving element extending in circumferential direction. Thus, the ability for assembling the driving element and the third bearing are improved, as the driving element during the insertion from below through the receiving opening is supported on the lower face of the third bearing. Furthermore, the rotor can be inserted in a simple manner into the driving element, as the further retaining ring prevents a moving of the driving element upwards. Further, the third bearing as well as the rotor and the driving element can additionally be axially supported during the operation of the angular gear arrangement.

In a preferred manner, the extension of an inner diameter of the transmission housing is, starting from the driving element in the area of the largest outer diameter of the driving element up to a housing opening, through which the crankshaft is passed, always larger than the maximal outer diameter of the driving element. In other words, the housing interior is sufficiently large formed, so that the third bearing and the driving element, i.e. through the housing opening, through which the crankshaft and/or the rotor is engaged, can be inserted or again removed from below. Thus, not only the rotor and the crankshaft, but also the third bearing and the driving element, assigned to the rotor, can be inserted from below through the housing opening into the transmission housing or can be removed therefrom. Besides a further housing opening, through which an input shaft of the bevel gear engages in the housing interior, the transmission housing does not require a further access opening for the assembly of the bevel gear. Thus, a simple to be manufactured and compact transmission housing is provided. In a known manner, the transmission housing can comprise further smaller openings, for example for the ventilation, for the lubrication in form of lubricating nipples or an inspection glass, wherein these openings are formed so small, that the third bearing or the driving element cannot be passed through. These openings are also not suitable for a shaft exit and are in diameter too small, to insert for the drive necessary components into the housing interior through these small openings. Especially, the diameters of these small openings are respectively not larger than 5 centimetres, especially not larger than 2 centimetres. Preferably, the transmission housing is formed as a one-piece component. I.e. the one-piece transmission housing has no removable housing lid or similar and encloses the housing interior, respectively a housing space, in which the rotor and the crankshaft as well as the input shaft are accommodated.

Furthermore, in the transmission housing at least one axial abutment element can be provided, wherein an upper face of the third bearing, facing away from the receiving opening or through which the crankshaft and/or the rotor are passed, abuts the abutment element. In this manner, the assembly of the third bearing is simplified, wherein the third bearing and the driving element can still be inserted or removed from below through the housing opening. Especially, the upper face and the lower face of the third bearing are aligned parallel to each other.

According to an aspect of the present invention it is provided, that the crankshaft is non-rotationally connected to a spur gear, wherein the crankshaft and the spur gear are separate components. The spur gear, also called cylindrical gear, is always engaged with an inner toothing, arranged concentrically in the transmission housing relative to the first axis of rotation. Thus, the crankshaft has no own outer toothing engaged with the inner toothing. Thus, the crankshaft can be designed independently of a transmission ratio, to be maintained because of the spur gear and the inner toothing.

Preferably, in an envelope face of the rotor, a through opening is provided such, that the spur gear is insertable radially to the second axis of rotation through the through opening into the receiving space. In this manner, the spur gear can be inserted through the through opening, formed in the envelope face of the rotor, into the receiving space. When the spur gear is inserted, the crankshaft can be inserted from below through the receiving opening into the receiving space and pushed into the spur gear. Thus, the assembly of the crankshaft in the rotor is simplified. Furthermore, an outer diameter of the spur gear can be larger than an inner radius of the first bearing supporting the rotor. Furthermore, a maximal radial distance between the first axis of rotation and an outer circumference of the spur gear can be larger than an inner diameter of the second bearing supporting the crankshaft. Because of the separation of the spur gear from the crankshaft, the spur gear does not have to be guided during the insertion by the first and/or the second bearing. Thus, the crankshaft can be manufactured narrower than the spur gear, i.e. with a smaller outer diameter.

According to a further aspect retaining means can be provided and formed such, that the spur gear is axially retained. The retaining means can have a retaining washer, wherein the retaining washer can engage in a circumferential groove of the crankshaft.

Furthermore, the retaining means can have a distance sleeve, through which the crankshaft engages, wherein the distance sleeve is arranged between the spur gear and the second bearing such, that the spur gear is axially supported on the second bearing. Advantageously, the distance sleeve and the crankshaft can non-rotationally be connected to each other. Furthermore, it can be provided, that the distance sleeve and the crankshaft are non-rotationally connected to each other by means of a tongue and groove connection, and that the crankshaft and the spur gear are non-rotationally connected to each other by means of a tongue and groove connection, wherein for the two tongue and groove connections, namely the tongue and groove connection between the crankshaft and the spur gear and for the tongue and groove connection between the crankshaft and the distance sleeve, in total only one single key is provided. Advantageously, the key engages for the tongue and groove connections in a first axial groove of the spur gear and in a second axial groove of the distance sleeve, aligned to the first axial groove. Thus, a simple to be manufactured and to be mounted support and/or retaining of the spur gear is provided. The one key can for example be a Woodruff Key. Generally, also other connections, especially a spur toothing, can be provided for the non-rotational connection of the distance sleeve to the crankshaft and/or for the spur gear to the crankshaft.

According to an embodiment of the present invention, the angular gear arrangement can have a bevel gear with eccentric drive mechanism. The bevel gear can have on the input-side an input shaft, which meshes by means of a bevel gear in the driving element of the rotor. The driving element can also be a bevel gear.

Independent of the design as bevel gear, the driving element and the rotor can be two separate components. This simplifies the assembly of the angular gear arrangement. The driving element can be non-rotationally connected for example by means of a tongue and groove connection to the rotor. Furthermore, at least one retaining ring or a shaft nut can fix the driving element on the rotor.

According to a further aspect of the present invention it can be provided, that the angular gear arrangement has furthermore an input shaft, rotatably supported in the transmission housing by means of at least one fourth bearing around a third axis of rotation arranged at an angle to the first axis of rotation. The input shaft can be non-rotationally connected to a further driving element, which is operatively connected to the driving element assigned to the rotor. The input shaft can be connected to a drive gear, especially a belt pulley. The drive gear can be non-rotationally connected directly to the further driving element by means of anti-rotation means. The anti-rotation means are, preferably, radially distanced from the input shaft. The anti-rotation means represent, thus, a direct rotary retaining between the drive gear and the further driving element. The direct anti-rotational connection between the drive gear and the further driving element can be especially represented by at least one pin-like element, which can be especially inserted into a first bore of the drive gear distanced radially from the input shaft and into a second bore of the further driving element assigned to the input shaft and which second bore is aligned axially to the first bore. The above named anti-rotation means do, however, not exclude, that the input shaft can be non-rotationally connected to the drive wheel and/or to the further driving element. For the axial retaining of the drive wheel on the input shaft, a shaft nut can, for example, be screwed onto the input shaft or a retaining ring can be clamped on.

BRIEF DESCRIPTION OF THE DRAWINGS

A preferred embodiment of the invention is shown in the drawings and is described in the following. Herein, it shows.

DETAILED DESCRIPTION OF THE INVENTION

Figure 1:
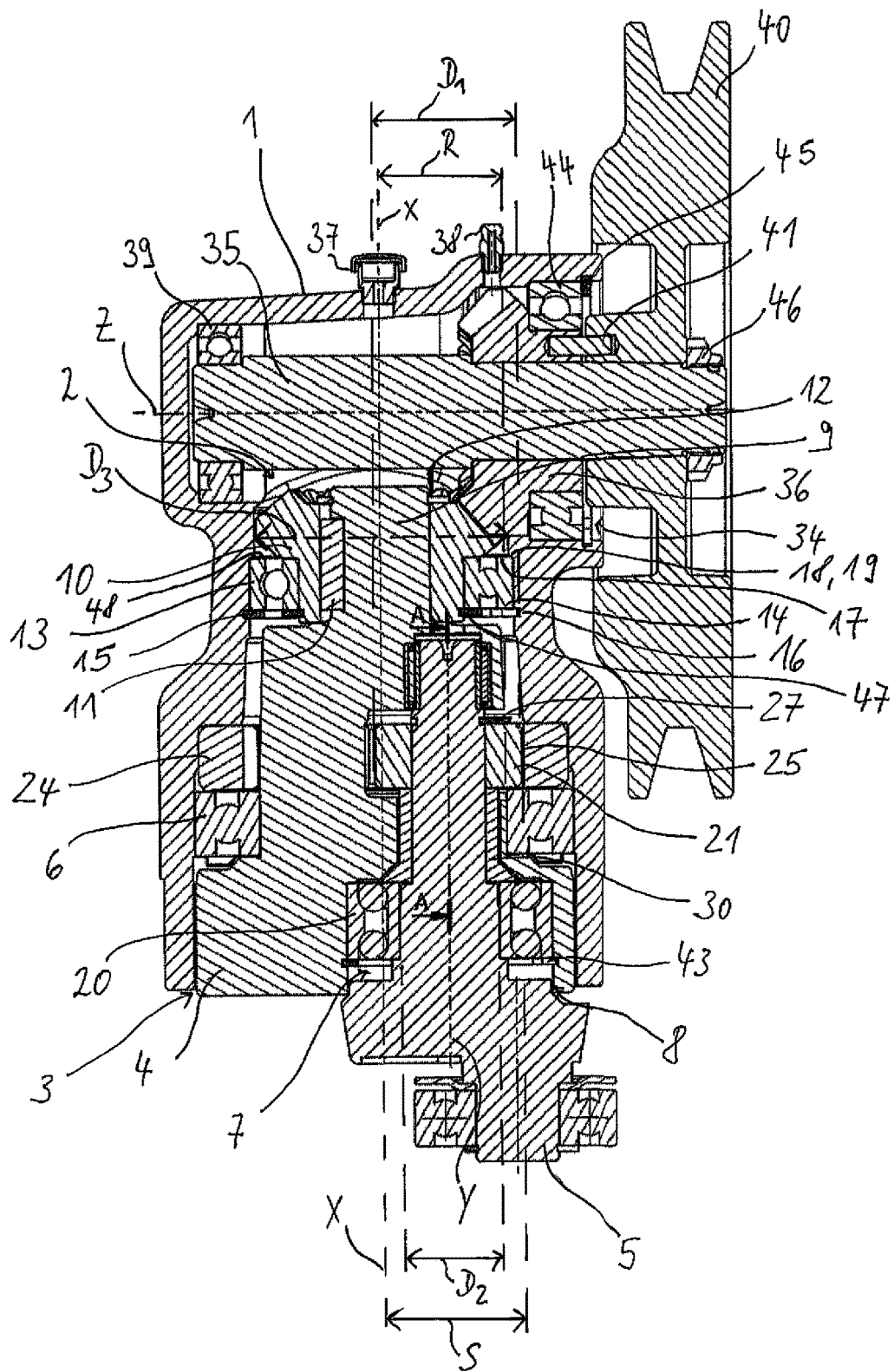
FIG. 1 an angular gear arrangement according to an embodiment in a sectional view.
Figure 2:
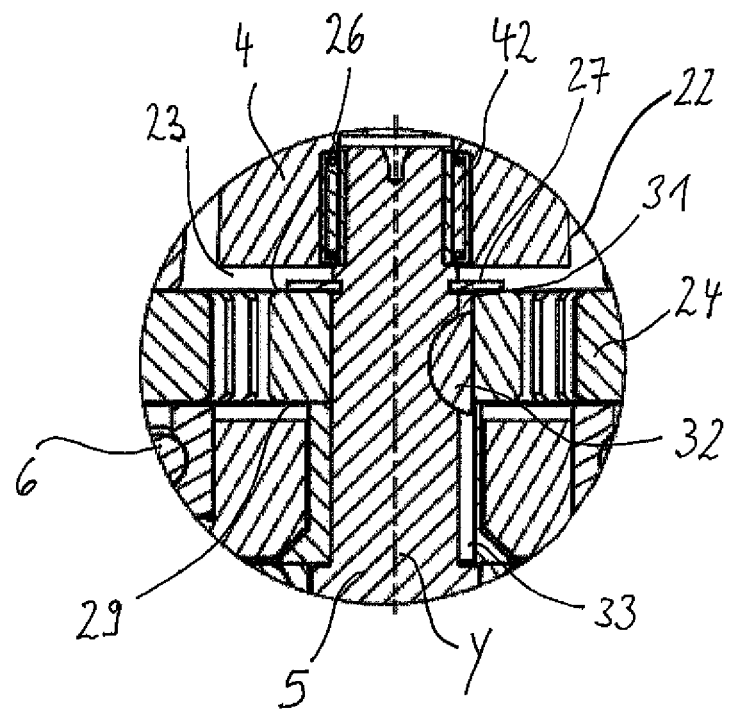
FIG. 2 a partial view of the angular gear arrangement along the line of intersection A-A of FIG. 1.
Figure 3:
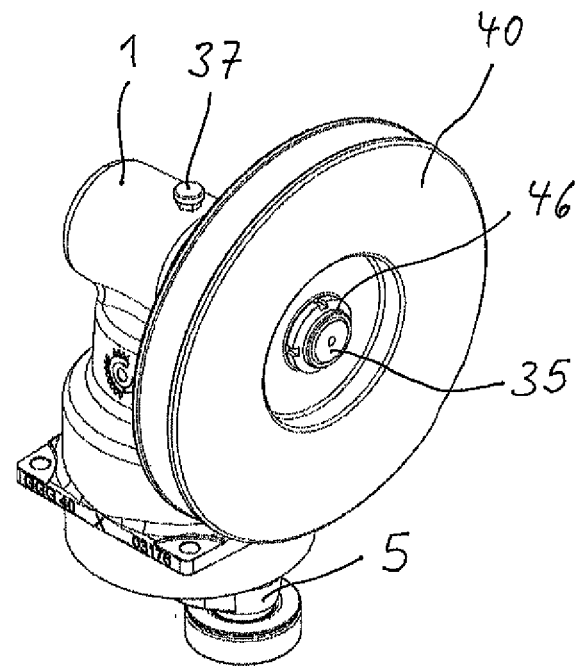
FIG. 3 the angular gear arrangement of FIG. 1 in a perspective representation.

In the FIGS. 1 to 3 an angular gear arrangement according to an embodiment of the present invention is shown. The angular gear arrangement has an eccentric drive, in which a rotational movement is transformed into a translational reciprocating movement for the oscillating drive of not shown mower knives of a harvesting machine in farming also not shown.

In FIG. 1 it is visible, that the angular gear arrangement has a transmission housing 1 formed as one piece and enclosing a housing space 2. In the transmission housing 1, a first housing opening 3 is formed, through which a rotor 4 and a crankshaft 5, supported eccentrically to the rotor 4, engages in the housing space 2.

The rotor 4 is rotatably supported in the transmission housing 1 by means of a first bearing 6 around a first axis of rotation X. The rotor 4 has an eccentrically arranged receiving space 7 with a receiving opening 8 arranged parallel to the first housing opening 3. In the receiving space 7, the crankshaft 5 is rotatably supported around a second axis of rotation Y radially offset to the first axis of rotation X. At a longitudinal end portion 9 of the rotor 4, arranged internally, a driving element 10 in form of a first bevel gear is mounted. The first bevel gear 10 is non-rotationally connected by means of a tongue and groove connection 11 to the rotor 4. Furthermore, a first retaining ring 12 is provided, which fixes the first bevel gear 10 axially on the rotor 4. The first bevel gear 10 is rotatably supported by means of a third bearing 13 around the first axis of rotation X. Furthermore, the first bevel gear 10 is axially supported by means of a further retaining ring 17 on a lower face 14 of the third bearing 13, facing the receiving opening 8 or the first housing opening 3, and on an upper face 17 of the third bearing 13, facing away from the lower face 14. The third bearing 13 is again supported with the lower face 14 on a second retaining ring 15. The second retaining ring 15 is detachably attached on the transmission housing 1 and engages in an inner groove 16 of the transmission housing 1, extending in circumferential direction. On an upper face 17 of the third bearing 13, facing away from the lower face 14, an abutment element 18, projecting into the housing space 2, is provided. The abutment element 18 is formed on the transmission housing 1 and has an annular axial shoulder 19 extending in circumferential direction. In the assembled condition of the third bearing 13, the upper face 17 of the third bearing 13 abuts the axial shoulder 19 of the abutment element 18.

The crankshaft 5 is rotatably supported in the receiving space 7 of the rotor 4 by means of a second bearing 20 and by means of a needle bearing 42 around the second axis of rotation Y offset radially to the first axis of rotation X. The second bearing 20 is supported by means of a third retaining ring 43 axially on the rotor 4. The crankshaft 5 is non-rotationally connected to a spur gear 21, wherein the crankshaft 5 and the spur gear 21 are separate components. In an envelope face 22 of the rotor 4, a through opening 23 is provided such, that the spur gear 21 can radially be inserted relative to the second axis of rotation Y through the through opening 23 into the receiving space 7. The spur gear 21 engages in an inner toothing 24 arranged concentrically to the first axis of rotation X in the housing space 2. The inner toothing 24 is formed on an inner ring which is detachably attached in the housing space 2 on the transmission housing 1. The outer diameter $D_1$ of the spur gear 21 is larger than an inner radius R of the first bearing 6. Furthermore, a maximal radial distance S between the first axis of rotation X and an outer circumference 25 of the spur gear 21 is larger than an inner diameter $D_2$ of the second bearing 20.

In FIG. 2 the retaining means for the axial retaining of the spur gear 21 is highlighted along the intersection line A-A shown in FIG. 1. In practice on the upper face 26 of the spur gear 21 facing the bevel gear 10, a retaining washer 27 is provided, engaging in a circumferential groove 28 of the crankshaft 5. On a lower face 29 of the spur gear 21 facing away from the upper face 26, a distance sleeve 30 is provided. The distance sleeve 21 is passed through by the crankshaft 5. The distance sleeve 30 is arranged between the spur gear 21 and the second bearing 20 such, that the spur gear 21 is axially supported by means of the distance sleeve 30 on the second bearing 20. The distance sleeve 30 and the crankshaft 5 are non-rotationally connected to each other by means of a tongue and groove connection. In practice, the spur gear 21 has a first axial groove 31, extending parallel to the first or second axis of rotation X, Y and radially directed to the interior and into which a Woodruff Key 32, held in the crankshaft, engages. The distance sleeve 30 has also a second axial groove 33, directed radially to the interior and forming together with the first axial groove 31 a continuously extending groove. The Woodruff Key 32 is arranged such, that it engages in the first axial groove 31 as well as in the second axial groove 33. In this manner the spur gear 21 as well as the distance sleeve 30 are non-rotationally connected by means of one Woodruff Key 32 to the crankshaft 5.

Besides the first housing opening 3, through which the rotor 4 and the crankshaft 5 pass, the transmission housing 1 has a second housing opening 34. An input shaft 35, rotatably supported by means of a fourth bearing 39 around a third axis of rotation Z, is concentrically arranged to the second housing opening 34. On the input shaft 35, a second bevel gear 36, which engages in the first bevel gear 10, is non-rotationally attached. The second bevel gear 36 is rotatably supported by means of a fifth bearing 44 around the third axis of rotation Z. The fifth bearing 44 is axially fixed by means of a fourth retaining ring 45 on the transmission housing 1. On a longitudinal end portion of the input shaft 35, arranged externally, a belt pulley is arranged, which is attached by means of a shaft nut 46, screwed onto the input shaft 35, to the input shaft 35. Furthermore, an anti-rotation pin 41 is provided, which engages in a first bore of the belt pulley 40, radially distanced to the input shaft 35, and in a second bore of the second bevel gear 36, aligned axially to the first bore, to non-rotationally connect the belt pulley 40 to the second bevel gear 36. Generally, several anti-rotation pins 41 can be provided in circumferential direction of the belt pulley.

Besides the two housing openings 3, 34, the transmission housing 1 has only smaller openings, which have a diameter of less than two centimetres. An opening for a ventilation filter 37 and an opening for a lubricating nipple 38 belong thereto.

Because of the detachable design of the second retaining ring 15, the driven-sided components of the bevel gear can be mounted in a simple manner from below through the first housing opening 3. The extension of an inner diameter of the transmission housing 1 from the first bevel gear 10 in the area of the largest outer diameter $D_3$ of the first bevel gear 10 up to the first housing opening 3 is always larger than the maximal outer diameter $D_3$ of the first bevel gear 10. Thus, the housing space 3 is formed sufficiently large, so that the third bearing 13 and the first bevel gear 10 can be inserted from below through the first housing opening 3 into the housing space 3.

Initially, the first bevel gear 10 is inserted together with the third bearing 13 through the first housing opening 3 into the transmission housing 1. The two components 10, 13 are inserted so far into the housing space 2 till the upper face 17 of the third bearing 13 abuts the axial shoulder 19 of the abutment element 18. In this assembly position, the third bearing 13 is axially fixed by the retaining ring 15, wherein the retaining ring 15 engages in the inner groove 16. Then, the preassembled unit of rotor 4 and crankshaft 5 are also inserted from below through the first housing opening 3 into the housing space 2. The longitudinal end portion 9 of the rotor 4 is pushed by the first bevel gear 10. Only for the axial fixing of the rotor 4, the retaining ring 12 has to be inserted through the second housing opening 34 into the housing space 2 and put onto the longitudinal end portion 9 of the rotor 4. Followingly, the input shaft 35 and the second bevel gear 36 can be inserted in the known manner through the second housing opening 34 into the housing space 2. It is obvious, that the bevel gear can again be dismantled in the reversed sequence, so that the description for the assembly is valid in analogous manner also for the dismantling.

REFERENCE NUMERALS LIST 1 transmission housing
2 housing space
3 first housing opening
4 rotor
5 crankshaft
6 first bearing
7 receiving space
8 receiving opening
9 longitudinal end portion
10 first bevel gear
11 tongue and groove connection
12 first retaining ring
13 third bearing
14 lower face
15 second retaining ring
16 inner groove
17 upper face
18 abutment element
19 shoulder
20 second bearing
21 spur gear
22 envelope face
23 through opening
24 inner ring
25 outer circumference
26 upper face
27 retaining washer
28 circumferential groove
29 lower face
30 distance sleeve
31 first axial groove
32 Woodruff Key
33 second axial groove
34 second housing opening
35 input shaft
36 second bevel gear
37 ventilation filter
38 lubricating nipple
39 fourth bearing
40 belt pulley
41 anti-rotation means
42 needle bearing
43 third retaining ring
44 fifth bearing
45 fourth retaining ring
46 shaft nut
47 retaining ring
48 upper face
D1 outer diameter
D2 inner diameter
D3 outer diameter
R inner radius
S distance
X first axis of rotation
Y second axis of rotation
Z third axis of rotation

The invention claimed is:

1. An angular gear arrangement for mower knife driven in an oscillating manner, comprising
   a transmission housing,
   an input shaft, which engages in the interior of the transmission housing through a housing opening,
   a rotor, which is mounted in the transmission housing so as to be rotatable about a first axis of rotation by means of at least one first bearing, the rotor having a receiving space having a receiving opening,
   a crankshaft, which engages in the receiving space of the rotor through the receiving opening and which is mounted in the receiving space, so as to be rotatable about a second axis of rotation by means of at least one second bearing,
   a driving element, which is non-rotationally connected to the rotor and which is mounted so as to be rotatable about the first axis of rotation by means of at least one third bearing,
   wherein the second axis of rotation, about which the crankshaft is rotatably supported, is arranged radially offset with respect to the first axis of rotation about which the rotor is rotatably mounted, and wherein the input shaft is mounted in the transmission housing so as to be rotatable about third axis of rotation arranged at an angle to the first axis of rotation by means of at least a fourth bearing, and
   support means, which are arranged in the transmission housing and on which the third bearing is axially supported,
   wherein
   the support means being releasably fastened to the transmission housing.

2. The angular gear arrangement according to claim 1, wherein the third bearing is supported with a lower face of the third bearing, directed to the receiving opening, on the support means.

3. The angular gear arrangement according to claim 1, wherein the support means have a retaining ring, wherein the retaining ring engages in an inner groove of the transmission housing extending in circumferential direction.

4. The angular gear arrangement according to claim 1, wherein the extension of an inner diameter of the transmission housing starting from the driving element in the area of the largest outer diameter of the driving element up to a housing opening, through which the crankshaft passes, is always larger than the maximal outer diameter of the driving element.

5. The angular gear arrangement according to claim 1, wherein the transmission housing is formed as one piece.

6. The angular gear arrangement according to claim 1, wherein the transmission housing, at least one axial abutment element is provided, wherein an upper face of the third bearing, facing away from the receiving opening, abuts the abutment element.

7. The angular gear arrangement according to claim 1, wherein the crankshaft is non-rotationally connected to a spur gear, wherein the crankshaft and the spur gear are separate components.

8. The angular gear arrangement according to claim 7, wherein in an envelope face of the rotor a through opening is provided such, that the spur gear is radially insertable relative to the second axis of rotation through the through opening into the receiving space.

9. The angular gear arrangement according to claim 7, wherein an outer diameter of the spur gear is larger than an inner radius of the first bearing.

10. The angular gear arrangement according to claim 7, wherein a maximal radial distance between the first axis of rotation and an outer circumference of the spur gear is larger than an inner diameter of the second bearing.

11. The angular gear arrangement according to claim 7, wherein retaining means are provided and formed such, that the spur gear is axially retained.

12. The angular gear arrangement according to claim 11, wherein the retaining means have a retaining washer, wherein the retaining washer engages in a circumferential groove of the crankshaft.

13. The angular gear arrangement according to claim 11, wherein the retaining means have a distance sleeve, through which the crankshaft passes, wherein the distance sleeve is arranged between the spur gear and the second bearing such, that the spur gear is axially supported on the second bearing.

14. The angular gear arrangement according to claim 13, wherein the distance sleeve and the crankshaft are non-rotationally connected to each other.

15. The angular gear arrangement according to claim 14, wherein the distance sleeve and the crankshaft are non-rotationally connected to each other by means of a tongue and groove connection, and that the crankshaft and the spur gear are non-rotationally connected to each other by means of a tongue and groove connection, wherein for the tongue and groove connection between the crankshaft and the spur gear and for the tongue and groove connection between the crankshaft and the distance sleeve in total only a single key is provided.

16. The angular gear arrangement according to claim 15, wherein the key for the tongue and groove connections engages in a first axial groove of the spur gear and in a second axial groove of the distance sleeve aligned to the first axial groove.

17. The angular gear arrangement according to claim 1, wherein the angular gear arrangement comprises furthermore:
a further driving element, non-rotationally connected to the input shaft and operatively connected to the driving element assigned to the rotor,
a drive wheel connected to the input shaft,
wherein the drive wheel is non-rotationally connected directly to the further driving element by means of anti-rotation means.

* * * * *